United States Patent
Blasi et al.

(10) Patent No.: US 10,623,394 B2
(45) Date of Patent: Apr. 14, 2020

(54) DEVICE AUTHENTICATION

(71) Applicant: Accenture Global Services Limited, Dublin (IE)

(72) Inventors: Luca Blasi, Rome (IT); Alessandro Orsano, Pomezia (IT); Emanuele Trevisi, Rome (IT)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 396 days.

(21) Appl. No.: 15/184,557

(22) Filed: Jun. 16, 2016

(65) Prior Publication Data

US 2016/0380997 A1   Dec. 29, 2016

(30) Foreign Application Priority Data

Jun. 24, 2015   (EP) ..................................... 15173623

(51) Int. Cl.
| | |
|---|---|
| *G06F 7/04* | (2006.01) |
| *H04L 29/06* | (2006.01) |
| *H04L 9/32* | (2006.01) |
| *G06F 21/43* | (2013.01) |
| *H04W 12/06* | (2009.01) |
| *H04W 12/00* | (2009.01) |

(52) U.S. Cl.
CPC .......... *H04L 63/0807* (2013.01); *G06F 21/43* (2013.01); *H04L 9/3215* (2013.01); *H04L 63/0853* (2013.01); *H04L 63/0876* (2013.01); *H04W 12/06* (2013.01); *H04W 12/00514* (2019.01); *H04W 12/00522* (2019.01)

(58) Field of Classification Search
CPC ..... G06F 21/44; G06F 21/31; H04L 63/0807; H04L 29/06761

USPC ............................................................. 726/9
See application file for complete search history.

(56) References Cited

U.S. PATENT DOCUMENTS

| | | | |
|---|---|---|---|
| 8,627,438 B1 | 1/2014 | Bhimanaik | |
| 9,819,665 B1 * | 11/2017 | Machani | ................. H04L 63/08 |
| 2007/0266426 A1 * | 11/2007 | Iyengar | ................. H04L 9/3213 726/5 |

(Continued)

FOREIGN PATENT DOCUMENTS

| | | |
|---|---|---|
| CN | 101909072 | 12/2010 |
| CN | 103269328 | 8/2013 |

(Continued)

OTHER PUBLICATIONS

Wang et al, Internet Traffic Classification Using Machine Learning: A Token-Based Approach, Aug. 26, 2011, IEEE, pp. 285-289.*

(Continued)

*Primary Examiner* — Alexander Lagor
*Assistant Examiner* — Jenise E Jackson
(74) *Attorney, Agent, or Firm* — Mannava & Kang, P.C.

(57) ABSTRACT

The present invention relates to a computer network that provides secure authentication. The computer network comprises a server operable to generate a token comprising identification information; a first device to be authenticated, the first device being operable to receive the token; a second device associated with a trusted identifier, the second device being operable to retrieve the token from the first device and associate the token with the trusted identifier to authenticate the first device at the server.

13 Claims, 3 Drawing Sheets

100

(56) References Cited

U.S. PATENT DOCUMENTS

| | | | |
|---|---|---|---|
| 2010/0070760 A1* | 3/2010 | Vanderveen | H04L 63/0823 |
| | | | 713/156 |
| 2010/0235632 A1* | 9/2010 | Iyengar | H04L 9/3213 |
| | | | 713/166 |
| 2012/0321087 A1* | 12/2012 | Fleischman | H04L 9/3213 |
| | | | 380/279 |
| 2013/0018793 A1* | 1/2013 | Wong | G06Q 20/4097 |
| | | | 705/44 |
| 2013/0227655 A1* | 8/2013 | Vanderveen | H04W 12/06 |
| | | | 726/4 |
| 2013/0263286 A1* | 10/2013 | Aillery | H04L 9/3215 |
| | | | 726/28 |
| 2014/0150079 A1* | 5/2014 | Le Nerriec | G06F 3/0484 |
| | | | 726/8 |
| 2014/0259116 A1* | 9/2014 | Birk | G06F 21/31 |
| | | | 726/4 |
| 2014/0282961 A1 | 9/2014 | Dorfman et al. | |
| 2015/0113601 A1* | 4/2015 | Luciani, Jr. | H04L 63/0281 |
| | | | 726/4 |
| 2015/0310194 A1* | 10/2015 | Zhang | G06F 21/31 |
| | | | 726/9 |
| 2015/0350208 A1* | 12/2015 | Bayramkul | G06F 21/34 |
| | | | 726/9 |
| 2016/0050565 A1* | 2/2016 | Benoit | H04W 12/06 |
| | | | 726/9 |
| 2017/0311163 A1* | 10/2017 | Tofighbakhsh | H04W 48/02 |

FOREIGN PATENT DOCUMENTS

| | | |
|---|---|---|
| CN | 104429039 | 3/2015 |
| CN | 104662864 | 5/2015 |
| GB | 2489332 A | 9/2012 |

OTHER PUBLICATIONS

Zhang et al, Location-Based Authentication and Authorization Using Smart phones, Jun. 27, 2012, IEEE, pp. 1285-1292.*

European Search Report dated Dec. 7, 2015, European Patent Application No. 15173623.8-1870 filed Jun. 24, 2015, European Patent Office.

Chinese Patent Office, "English translation of Search report on Chinese patent application No. 201610466091.7", dated Jul. 17, 2019, 14 pages.

* cited by examiner

DEVICE AUTHENTICATION

PRIORITY

The present application claims priority under 35 U.S.C. 119(a)-(d) to European patent application number 15173623.8, having a filing date of Jun. 24, 2015, the disclosure of which is hereby incorporated by reference in its entirety.

TECHNICAL FIELD

The following description relates to a network, a module, a method and a product for securely authenticating a device.

BACKGROUND

Electronic devices such as computers, mobile phones and tablets usually require an authentication of a user, in order to prevent unauthorized access or to provide personalized features. Exemplarily, the authentication process is particularly important when online financial transactions take place on the device.

Typically, authentication of the user consists in the provision, by the user, of a combination of user name and password. However, there are many drawbacks in the password-based authentication. Passwords need to be manually entered every time that a new access to the device is required. This bothersome procedure often deters users from securing the access to the device. Furthermore, to ensure an appropriate level of security, passwords should comply with some complexity constraints such as containing both alphanumeric and special characters, and each device should possibly have a different password. The effort of remembering is also perceived as a burden by the user and, thus, may affect the level of security. Additionally, passwords may be hacked, phished or seen by unauthorized users during inputting on the device. Since the identity of the user is merely associated with the knowledge of the password, an unauthorized user in possession of the password may easily fake the identity of the real user. Therefore the password may provide identification, but not necessarily authentication, in the sense that no reliable confirmation of the identity of the user is provided.

SUMMARY

According to one aspect, a computer network that provides secure authentication is provided. The computer network may comprise:
- a server operable to generate a token comprising identification information;
- a first device to be authenticated, the first device being operable to receive the token;
- a second device associated with a trusted identifier, the second device being operable to:
  - retrieve the token from the first device;
  - associate the token with the trusted identifier to authenticate the first device at the server.

The token particularly is a piece of data that may be used for purposes of identification in the computer network. The data it contains comprise identification information that may generally be in the form of alphanumeric strings. The token may be generated as a concatenation of the alphanumeric strings representing the identification information. Exemplarily, the token may be encrypted, such as in the form of an encrypted string (e.g. hashed particularly with a non-invertible hash function).

The identification information may be, according to one example, a combination of an IP address and a port number. The IP address may be given by a number randomly generated or arbitrary within a range encompassing numbers corresponding to valid IP addresses, particularly with the provision of avoiding any real IP address actually used in the Internet. A port number corresponding to the IP address may also be randomly generated or arbitrary. The generated IP address may particularly be specified according to the Internet Protocol version 4 (IPv4) as described in IETF publication RFC 791 (September 1981).

A first device may require authentication, namely it may require a secure determination of the identity of a user using the first device.

The first device to be authenticated (e.g. a portable device such as a tablet) may receive the token comprising the identification information from the server. The identification information contained in the token may be used to univocally identify the first device within the network. The transmission of the token from the server to the first device may occur exemplarily through the Internet. Specifically, the transmission may occur through a secure channel (such as a virtual private network, vpn) or using a secure protocol (such as https).

A second device may be associated with a trusted identifier. A trusted identifier may be information or a piece of data that is dependably linked to or corresponds to the identity of a user using the second device. In other words, the association between the user and the identifier has been validated by a trustworthy source and cannot be easily faked. The second device being associated with the trusted identifier may indicate that the trusted identifier is an intrinsic feature of the second device and/or that the second device requires the trusted identifier for functioning so that the second device and the trusted identifier are used in combination. Exemplarily, the second device may be a mobile phone and the trusted identifier may be or correspond to the Mobile Station International Subscriber Directory Number (MSISDN), which is a number uniquely identifying a subscription in a mobile network (e.g. a GSM or UMTS mobile network). Alternatively or additionally, the trusted identifier may be or correspond to an International Mobile Subscriber Identity (IMSI) which can be used to identify the user of a cellular network and particularly represents a unique identification associated with all cellular networks. It particularly may be stored as a 64 bit field and/or may be sent by the phone to the network.

The second device may retrieve the token comprising the identification information from the first device. The second device may, thus, acquire the identification information univocally identifying the first device e.g. via a software application. In one example, the first device may generate and display a Quick Response (QR) code including the token. The retrieval of the token by the second device from the first device may then exemplarily take place by scanning the QR code with a software application on the second device.

The second device may subsequently associate the token with the trusted identifier to authenticate the first device at the server. Associating the token with the trusted identifier may indicate that it is possible to trace one back starting from the other, i.e. that starting from the token the trusted identifier can be obtained and vice versa. It may additionally or alternatively indicate that the token and the trusted identifier are always jointly processed, e.g. read, written, transmitted and/or stored together. According to one example, the associated token and trusted identifier may by comprised in authentication data sent from a software application on the second device to the server. As described, the identification information comprised in the token may univocally identify the first device. From the association between the token comprising the identification information and the trusted identifier, it follows that the first device may be univocally associated with the trusted identifier and, thus, authenticated via the trusted identifier. Thus, secure authentication is provided.

According to a further example, the server may comprise at least two components, a first component being operable to generate the token and a second component being operable to write the authentication data in a database and/or to read the authentication data from the database. For instance, the second component may store the identification information contained in the token and the trusted identifier e.g. in a table of a database. In another example, two different components may be used for reading and writing. Exemplarily, the components of the server may be application programming interfaces (APIs).

According to a yet further example, the second device may be operable to send the authentication data to the first component of the server and/or the first component may be further operable to validate the token as having been generated by the first component and to forward the authentication data to the second component of the server. The first component, after having generated the token, may receive the token back before the authentication data are written to a database. The first component may particularly check that no data breach has occurred, e.g. that the identification information identifying the first device has not been replaced by identification information identifying an unauthorized device. In other words, the first component may ensure that the trusted identifier is used to authenticate the first device and not another device. Thus, secure authentication is provided. Exemplarily, a temporal limit may be set to the interval of time between the generation of the token and the receipt of the same token by the first component. If the token arrives within the specified (predetermined or predeterminable) time limit, the first component may validate the token and proceed to send the authentication data to the second component. If the token arrives after the time limit has expired, it is not considered valid.

As a further example, the token may be encrypted using a private key known only by the first component. The first component may subsequently decrypt the token with the private key and then verify that the output matches the expected format. A token modified by a third party will not respect the expected format after the decryption process.

According to another yet further example, the first device may be authenticated via the trusted identifier in response to communicating the identification information to the server.

The authentication data written to the database comprise the associated token and trusted identifier. Therefore the first device particularly may, in response to communicating the identification information contained in the token, be linked to the associated trusted identifier and consequently be authenticated via the trusted identifier. Exemplarily, the second component of the server may receive the identification information, read the associated trusted identifier from the database and authenticate the first device.

According to another example, the first device may generate the identification information and send the identification information to the server. The first device may, thus, itself generate the identification information that may univocally identify it. The identification information may then be sent to the server in order to obtain a token suitable to be retrieved by the second device. In one example, as mentioned, the token is created by concatenating the strings constituting the identification information. Further, the token may be encrypted by the server and included in a QR code by the first device.

According to a further example, the first device may comprise an application software operable to generate the identification information. For instance, the application software may be a web browser comprising JavaScript to generate (pseudo-) random or arbitrary numbers used for the identification information, such an IP address and a port number. The identification may further comprise an identifier of the application software. As in the examples discussed above, the token may then be a concatenated string comprising the alphanumeric strings constituting the IP address, the port number and the application software identifier. Additionally or alternatively, the application software may generate and display a QR code and/or graphic symbol including the token (or allowing it to be extracted therefrom), according to one of the examples previously presented.

According to another aspect of the invention, a computer module that provides secure authentication is provided. The module may be operable to:
  retrieve a token comprising identification information from a first device to be authenticated;
  automatically retrieve, from a server, a trusted identifier associated with a second device;
  associate the token with the trusted identifier;
  send authentication data comprising the associated token and the trusted identifier to the server.

According to one example, the second device may be a mobile phone and the trusted identifier may be or correspond to the MSISDN. Alternatively or additionally, the trusted identifier may be or correspond to an International Mobile Subscriber Identity (IMSI) which can be used to identify the user of a cellular network and particularly represents a unique identification associated with all cellular networks. It particularly may be stored as a 64 bit field and/or may be sent by the phone to the network. A mobile network operator provides both Internet services and mobile services to the mobile phone. Thus, the Internet connection data such as the IP address and the port number are inherently linked to the mobile phone data, such as the MSISDN and/or the IMSI. The computer module may access a server of the mobile network operator with the IP address and the port number of the mobile phone and automatically retrieve the corresponding MSISDN, without any manual configuration on the side of a user. Exemplarily, the computer module may be part of the second device, e.g. a software application running on the second device.

According to another example, the token is included in a QR code and the computer module is further operable to scan the QR code to retrieve the token.

According to another aspect of the invention, a computer-implemented method that provides secure authentication is provided. The method may comprise:
  generating, by a server, a token comprising identification information;
  receiving, by a first device, the token;
  retrieving, by a second device associated with a trusted identifier, the token from the first device;
  associating, by the second device, the token to the trusted identifier to authenticate the first device at the server.

According to a further aspect of the invention, a computer program product is provided. The product may comprise computer-readable instructions which, when loaded and executed on a suitable system, perform the steps of a secure authentication method according to the previous aspect.

BRIEF DESCRIPTION OF THE DRAWINGS

Details of exemplary embodiments are set forth below with reference to the exemplary drawings. Other features will be apparent from the description, the drawings, and from the claims. It should be understood, however, that even though embodiments are separately described, single features of different embodiments may be combined to further embodiments.

DETAILED DESCRIPTION

In the following, a detailed description of examples will be given with reference to the drawings. It should be understood that various modifications to the examples may be made. Unless explicitly indicated otherwise, elements of one example may be combined and used in other examples to form new examples.

Figure 1:
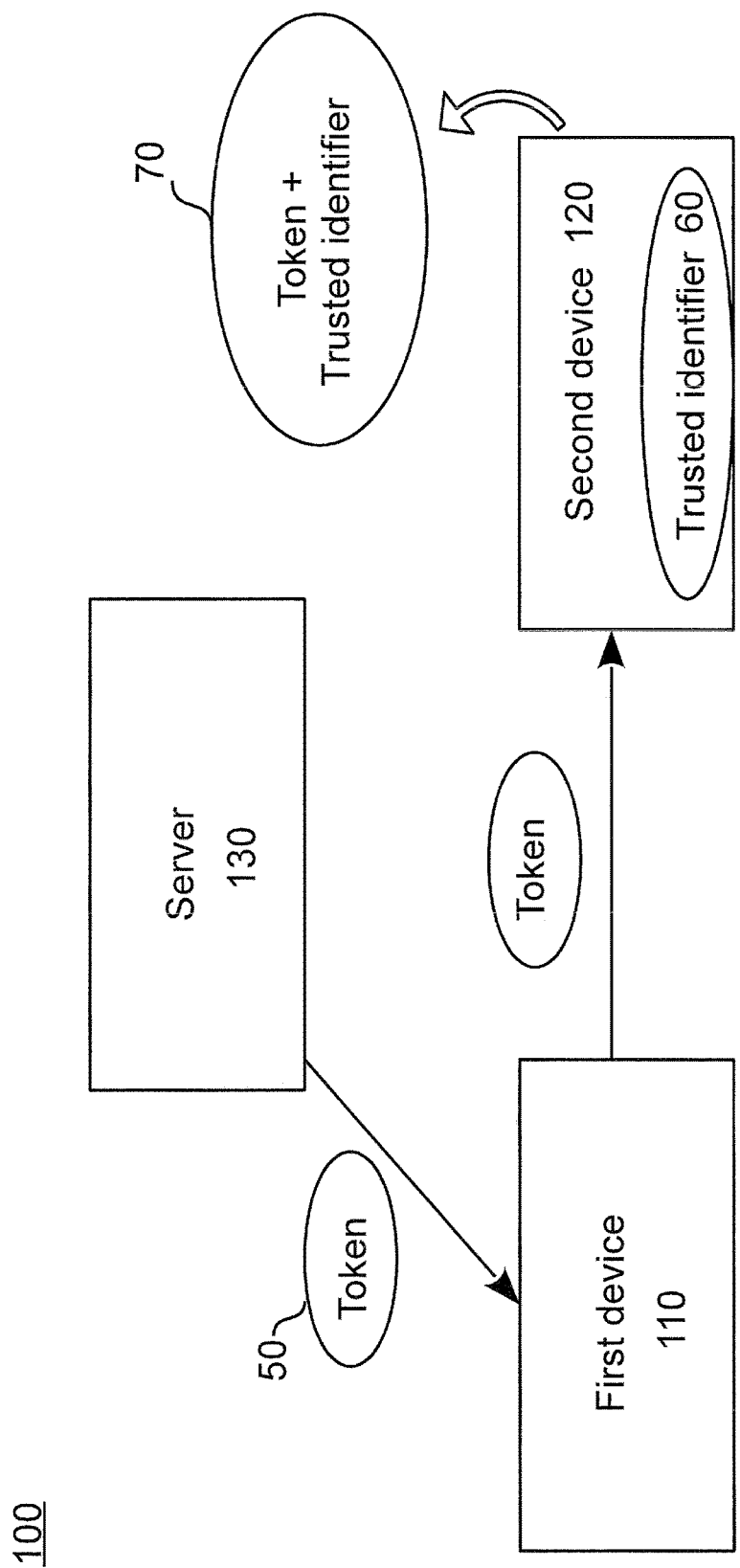
FIG. 1 shows an example of a computer network according to an embodiment that provides secure authentication.

FIG. 1 shows an example of a computer network according to an embodiment that provides secure authentication. The computer network 100 may comprise at least one first device 110 (e.g. a mobile device such as a tablet) that needs authentication at a server 130 with which the first device 110 interacts. A second device 120 may be inherently authenticated by means of its association with a trusted identifier 60. It should be understood that while the present embodiment is described with respect to a single first device 110 (such as a tablet), a plurality of first devices 110 may be authenticated in a secure manner according to the present concept or process. Exemplarily, the second device 120 may be particularly a mobile phone and the trusted identifier may be or correspond to the Mobile Station International Subscriber Directory Number (MSISDN), which is a number uniquely identifying a subscription in a mobile network (e.g. a GSM or UMTS mobile network). Alternatively or additionally, the trusted identifier may be or correspond to an International Mobile Subscriber Identity (IMSI) which can be used to identify the user of a cellular network and particularly represents a unique identification associated with all cellular networks. It particularly may be stored as a 64 bit field and/or may be sent by the mobile phone 120 to the network. The server 130 may be connected to the mobile network and/or may be able to retrieve the MSISDN and/or IMSI of the mobile phone 120. Accordingly, the second device 120 may be used to achieve a seamless authentication for the first device 110, namely without any input of data such as username and password by a user of the first 110 and second 120 devices, as described hereinafter.

The server 130 may generate at least one token 50 comprising identification information for the first device 110 and send the token 50 to the first device 110 particularly in an encrypted manner. The second device 120 may retrieve the token 50 from the first device 110 and associate the token 50 with its trusted identifier 60. In other words, the second device 120 may establish a link between the identification information identifying the first device 110 and the trusted identifier 60, so that the first device 110 can be authenticated based on the trusted identifier 60. According to one example, the second device 120 may send authentication data 70 comprising the associated token 50 (or information corresponding thereto) and the trusted identifier 60 (or information corresponding thereto) to the server 130.

The computer network 100 accomplishes the process of authentication of a first device 110 both in an efficient and secure manner. The authentication particularly is efficient, because it does not require time-consuming, error-prone human input to verify the identity of a user using the first device 110. Furthermore, the lack of human input specifically makes it more difficult to fake an identity by e.g. stealing credentials. The authentication particularly is made secure by relying on a trusted identifier 60, which provides a trustworthy identification of a user of the second device 120. According to one example, the second device 120 may be a mobile phone and the trusted identifier 60 may be the MSISDN and/or IMSI. The MSISDN particularly corresponds to the telephone number stored on the subscriber identification module (SIM) card in a mobile phone and univocally identifies the mobile phone subscriber, i.e. the user. For instance, the MSISDN provides access to the home location register (HLR). The HLR is a central database that contains details of each mobile phone subscriber that is authorized to use the global system for mobile communications (GSM) network. When a user obtains (e.g. buys) a SIM card for his mobile phone from a mobile network operator, he is required to provide an identity document such as a passport. Thus, the MSISDN of the SIM card is a reliable identifier of the identity of a user, contrary to e.g. a Facebook or Twitter username, which can be easily faked. A mobile phone needs a SIM card to operate because the SIM card and the data thereon such as the MSISDN act as login credentials to access the GSM or UMTS network. The mobile network operator is, thus, in possession of the association between a SIM card and a user's proven identity and can particularly act as a trustworthy source (or trusting authority) providing the trusted identifier and/or validating the identifier in the authentication process.

Therefore, since the mobile phone 120 contains identification data of a trustworthy source, a secure and easy (particularly seamless) authentication may consequently be accomplished by shifting the trusted identifier 60, e.g. the MSISDN and/or IMSI, from being "caged in the device" 120 to being "portable to any device" such as the first device 110 (e.g. a tablet). Such a shift or transfer may be achieved by a computer module such as a software application installed on the mobile phone 120, which is configured to retrieve the trusted identifier 60 and the token 50 identifying another device (or the first device 110) and associate one to the other. By means of this association, the trusted identifier 60 is no longer used only to authenticate the mobile phone 120 (as a particular second device 120) but also the other device (as a particular first device 110), such as a tablet. The trusted identifier 60 can therefore be leveraged for a plurality of devices 110 other than the mobile phone 120. Again, it should be highlighted that the software application does not require any manual data input by the mobile phone subscriber, i.e. the user. Exemplarily, the first time the application is opened after having been downloaded on the mobile phone, it may automatically retrieve the MSISDN and/or IMSI in virtue of its connection to the mobile network, e.g. as a response to the IP address and port assigned to the mobile phone 120 by the mobile network operator particularly acting as the trustworthy authority. The network automatic provisioning specifically guarantees that the application retrieves a trusted identifier 60, avoiding any fraud that may derive from manual configuration.

Figure 2:
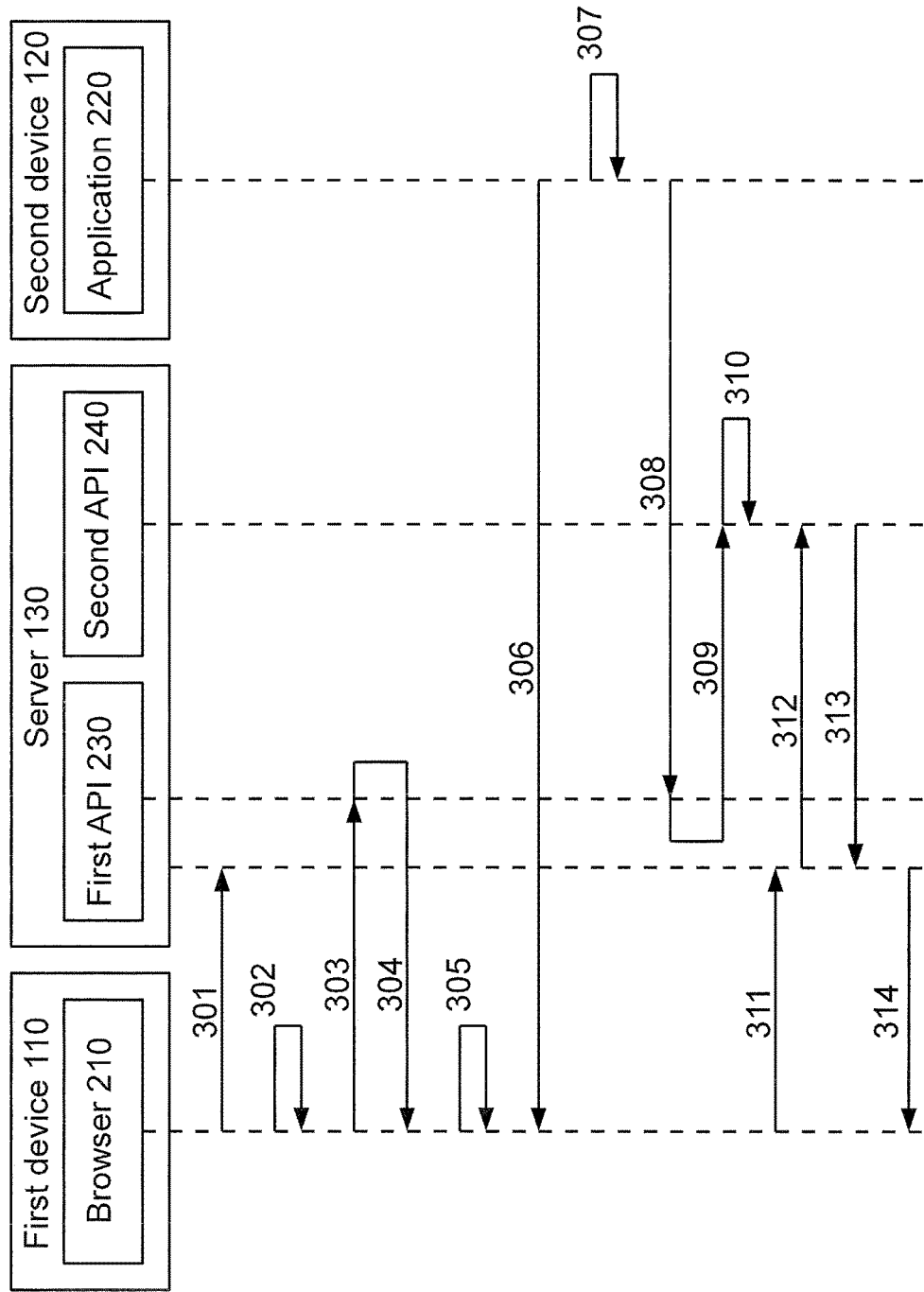
FIG. 2 shows an example of the operations of a computer network that provides secure authentication.

FIG. 2 shows an example of the operations of a computer network that provides secure authentication. The computer network shown in FIG. 2 may be an exemplary embodiment of the computer network 100, wherein the second device 120 comprises a software application (or application, for short) 220. The application 220 may be configured to operate as discussed above to associate the trusted identifier 60 to one or more other devices 110. The server 130 may comprise at least two components, exemplarily two APIs 230 and 240, with different functionalities, as explained in the following. The first device 110 may comprise an application such as a browser 210 to communicate with the server 130.

In the following, an exemplary set of operations 301 to 314 will be described with reference to FIG. 2.

At step 301, a user may open the browser 210 on the first device 110 (e.g. a computer or a tablet) to access a web page portal via the server 130. In another example, the web page portal may be accessed via a different server than the server 130, wherein the server 130 may be only dedicated to generating/validating the token and storing information concerning the user identity. The web page portal may require authentication of the user in order e.g. to provide access to personal data of the user.

At step 302, the browser 210 may generate identification information to identify the first device 110. For example, the identification information may comprise or consist of three strings corresponding to an IP address, a port number and a portal ID, the latter identifying browser 210. The identification information may be randomly generated. The browser 210 may feature implementations of JavaScript to perform the random generation. The IP address may be in an IPv4 format (i.e. the generated IP address may particularly be specified according to the Internet Protocol version 4 (IPv4) as described in IETF publication RFC 791, September 1981). IPv4 addresses may be written in any notation expressing a 32-bit integer value, but they are most often written in the dot-decimal notation, which consists of four octets of the address expressed individually in decimal and separated by periods. The IP address may hence comprise four decimal numbers, one number for each octet. The first two numbers may be random or arbitrary integers between 240 and 254 and the third and fourth number may be random or arbitrary integers between 1 and 254. When generating the IP address for the identification information, real IP addresses actually used by the mobile and fixed network operator should be avoided. Restricting the first two numbers to a range between 240 and 254 accomplishes this purpose, since such addresses are usually not allocated or are reserved for private IP addresses. Indeed, according to the allocation of IPv4 addresses as established by the Internet Assigned Numbers Authority (IANA), the above range is reserved for future use and hence not currently allocated (see http://www.iana.org/assignments/ipv4-address-space/ipv4-address-space.xhtml). The IP address may represent a good candidate for the identification information, since existing applications may be configured to work on IP addresses. Therefore the operations herein described may be smoothly integrated into existing systems.

Specifically, the port number may be a (pseudo-) random or arbitrary integer with 4 or 5 digits. The portal ID may be randomly generated as a 32 character alphanumeric string, including numbers and special characters.

At step 303, the identification information may be sent from the browser 210 to the first API 230, requesting a token 50.

At step 304, the first API 230 may generate a token 50 by creating a string from the concatenation of the IP address, the port number and the portal ID. In an example, the first API 230 may encrypt the string based on asymmetric cryptography and store the private key in the server 130. The first API 230 may send a response to the browser 210 and provide the token 50 containing the encrypted string with the IP address, the port number and the portal ID.

At step 305, the browser 210 may generate a Quick Response (QR) code or matrix barcode or two-dimensional barcode (e.g. via JavaScript) based on the received encrypted token 50 and/or display the QR code on a screen of the first device 110. The QR code particularly may be generated according to the standard ISO/IEC 18004:2015 which specifically defines the requirements for the symbology known as QR Code. It particularly specifies the QR Code symbology characteristics, data character encoding methods, symbol formats, dimensional characteristics, error correction rules, reference decoding algorithm, production quality requirements, and/or user-selectable application parameters. It should be understood that any symbol and/or graphic element (such as a bar code) other than a QR code may be (alternatively or additionally) used according to the present embodiment, as long as the symbol and/or the graphic element may be detected by the second device 120 and includes information corresponding to the encrypted token 50, so that the second device 120 may retrieve the token 50 comprising the identification information from the first device 110 via the displayed QR code, symbol and/or graphic element.

At step 306, the user may capture (e.g. scan) the QR code with the application 220 on the second device 120, e.g. via an imaging device (such as a camera) on the second device 120 e.g. using an according application. The QR code may be processed at the second device 120 particularly using Reed-Solomon error correction until the image can be appropriately interpreted. The required data may be particularly extracted from patterns present in both horizontal and vertical components of the captured image of the QR code.

At 307, the application 220 may associate the token 50 retrieved from the captured (scanned) QR code and the trusted identifier 60 associated with the second device 120. In one example, the application 220 may further associate an app identifier, identifying the application 220. The addition of the app identifier particularly may decrease the possibility of data counterfeiting.

At step 308, the application 220 may send the authentication data 70 comprising the associated token 50 and the trusted identifier 60 (and optionally the app identifier) to the first API 230 for validation.

At step 309, the first API 230, having generated the token 50, may particularly verify that no tampering of the authentication data 70 has occurred. For example, a hacker may try to substitute the token 50 identifying the first device 110 with another token to exploit the association with the trusted identifier 60 and authenticate a (different) device e.g. of the hacker with the credentials of the user. The first API 230 may check whether the token received from the application 220 is indeed the token 50. For example, a temporal limit (or a validity time window) may be set to the interval of time between the generation of the token 50 and the receipt of the same token by the first API 230. If the token 50 arrives within the time limit, the first API 230 validates the token 50. If the token arrives after the time limit has expired, it is not considered valid. If the token 50 has been validated, the first API 230 may forward the authentication data 70 to the second API 240. As a further example, the token 50 may be encrypted using a private key known only by the first API 230. The first API 230 may subsequently decrypt the token 50 with the private key and then verify that the output matches the expected format. A token 50 modified by a third party will not respect the expected format after the decryption process.

At step 310, the second API 240 may write or communicate the authentication data 70 to a database of the server 130. Although not shown in FIG. 2, the second API 240 may send a confirmation of the storing operation to the first API 230, which in turn may communicate the successful outcome of the authentication to the application 220. The application 220 may then display (show e.g. a popup window) on the second device 120 to inform the user that authentication of the first device 110 has been achieved.

Next, at step 311, the user may try to access his personal area on the web page portal. Consequently, at step 312, the identification information of the first device 110 may be sent to the second API 240.

The second API 240 may read the authentication data 70 from the database and, based on the association between the token 50 comprising the identification information of the first device 110 and the trusted identifier 60, the second API may at step 313 authenticate the first device 110 on the web page portal.

In another example, two different APIs may be used to write the authentication data and to read the authentication data. Accordingly, the second API 240 may only be involved in steps 309 and 310. A third API may receive the identification information of the first device 110 at step 312, read the authentication data 70 and authenticate the first device 110 at step 313.

At step 314, the web page portal may show to the user his personal area in the browser 210 on the first device 110, which has been authenticated.

A set of operations as illustrated within the computer network 100 allows a user to be securely authenticated at the first device 110 without having to manually provide credentials. The computer network 100 leverages the existence of a trusted identifier 60 associated with the second device 120 and creates a second, secure association between the trusted identifier 60 and the first device 110. The computer network 100 operates with minimal input from the user, reducing the risk of fraudulent identification, and additionally provides internal measures to avoid misuse of the trusted identifier by unauthorized parties.

Figure 3:
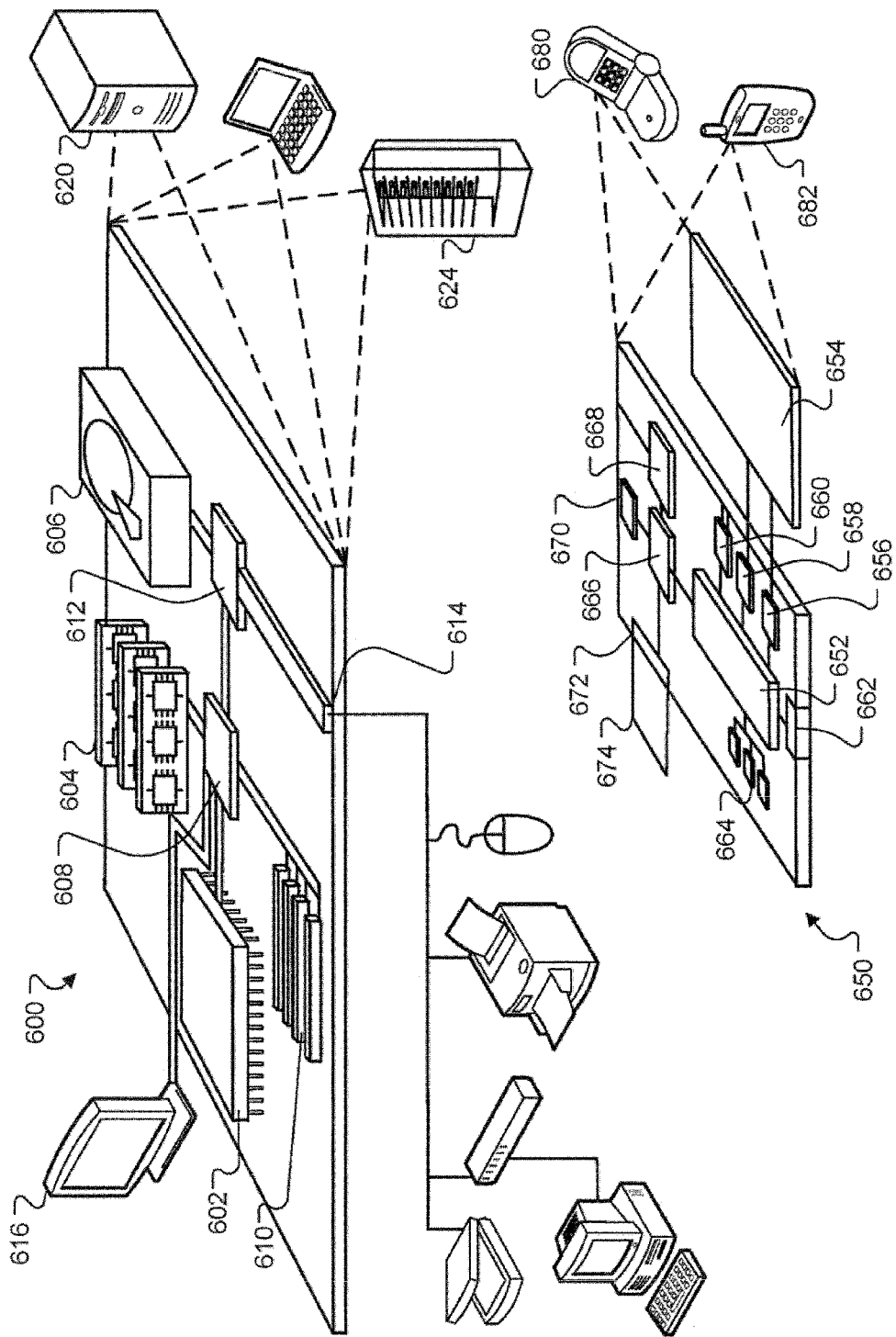
FIG. 3 shows an example of a computing device and a mobile computing device.

FIG. 3 shows an example of a computing device 600 and a mobile computing device 650 that can be used to implement the techniques described in this disclosure. Exemplarily, one or more of the first device 110, the second device 120 and the server 130 may be implemented as computing device 600 and/or mobile computing device 650. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used. The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems.

The invention claimed is:

1. A computer network that provides secure authentication, the computer network comprising:
a first device including a hardware processor, wherein the first device generates identification information, and sends the identification information to a server, wherein the identification information comprises a randomly generated valid IP address and a randomly generated port number, wherein
the server generates a token comprising the identification information, and
the first device to be authenticated receives the token from the server;
a second device associated with a trusted identifier, wherein the second device:
retrieves the token from the first device;
associates the token with the trusted identifier to authenticate the first device at the server; and
sends authentication data comprising the associated token and the trusted identifier to the server,
wherein the authentication data allows the first device to be authenticated via the trusted identifier based on the identification information comprised in the token, and the first device is authenticated, by the server via the trusted identifier, in response to the first device communicating the identification information to the server, and
the server comprises at least two components, wherein the first component generates the token and the second component writes the authentication data to a database and reads the authentication data from the database.

2. The computer network according to claim 1, wherein the second device sends the authentication data to the first component and the first component further validates the token as having been generated by the first component and forwards the authentication data to the second component.

3. The computer network according to claim 1, wherein the second device is a mobile phone and the trusted identifier is a Mobile Station International Subscriber Directory Number.

4. The computer network according to claim 1, wherein the first device generates and displays a Quick Response code including the token.

5. The computer network according to claim 1, wherein the token is an encrypted token.

6. The computer network according to claim 1, wherein the first device comprises an application software that generates the identification information, wherein the identification information preferably further comprises an identifier of the application software.

7. The computer network according to claim 1, wherein the identification information further comprises a randomly generated portal identifier.

8. A computer that provides secure authentication, the computer comprising:
a processor, and
a non-transitory computer-readable medium including machine-readable instructions executable by the processor to:
retrieve a token comprising identification information from a first device to be authenticated, wherein the first device generates the identification information, and sends the identification information to a server, and the identification information comprises a randomly generated valid IP address and a randomly generated port number;
automatically retrieve, from the server, a trusted identifier associated with a second device;
associate the token with the trusted identifier; and
send authentication data comprising the associated token and the trusted identifier to the server,
wherein the authentication data allows the first device to be authenticated via the trusted identifier based on the identification information comprised in the token, and the first device is authenticated, by the server via the trusted identifier, in response to communicating the identification information to the server, and
the authentication data are configured to be written to a database and read from the database.

9. The computer according to claim 8, wherein the second device is a mobile phone and the trusted identifier is a Mobile Station International Subscriber Directory Number.

10. The computer according to claim 8, wherein the token is included in a Quick Response code and the computer is further operable to scan the Quick Response code to retrieve the token.

11. The computer according to claim 8, wherein the identification information further comprises a randomly generated portal identifier.

12. A computer-implemented method that provides secure authentication, the method comprising:
generating, by a first device, identification information;
sending by the first device, the identification information to a server, wherein the identification information comprises a randomly generated valid IP address and a randomly generated port number;
generating, by the server, a token comprising identification information;
receiving, by the first device, the token;
retrieving, by a second device associated with a trusted identifier, the token from the first device;
associating, by the second device, the token to the trusted identifier to authenticate the first device at the server by sending authentication data comprising the associated token and the trusted identifier to the server, wherein the authentication data allows the first device to be authenticated via the trusted identifier based on the identification information comprised in the token, and the first device is authenticated, by the server via the trusted identifier, in response to communicating the identification information to the server; and
writing, by the server, the authentication data to a database and reading the authentication data from the database.

13. The computer-implemented method according to claim 12, wherein the identification information further comprises a randomly generated portal identifier.

* * * * *

UNITED STATES PATENT AND TRADEMARK OFFICE
CERTIFICATE OF CORRECTION

PATENT NO. : 10,623,394 B2
APPLICATION NO. : 15/184557
DATED : April 14, 2020
INVENTOR(S) : Luca Blasi et al.

It is certified that error appears in the above-identified patent and that said Letters Patent is hereby corrected as shown below:

On the Title Page

At Item (30), Foreign Application Priority Data "15173623" should be "15173623.8".

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*